Oct. 24, 1939.  T. MAXWELL  2,177,531
TOOL PROTECTOR
Filed May 21, 1938
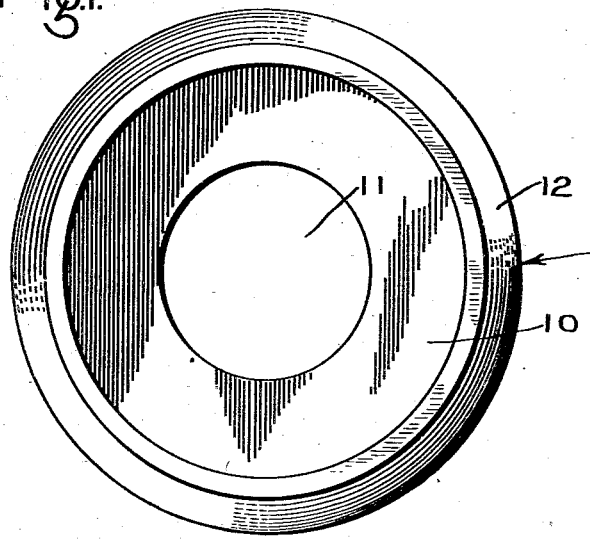
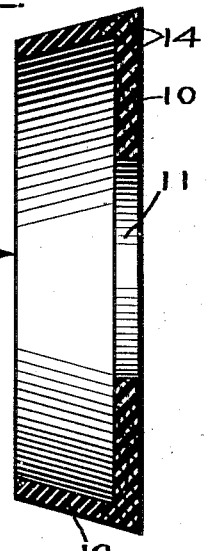
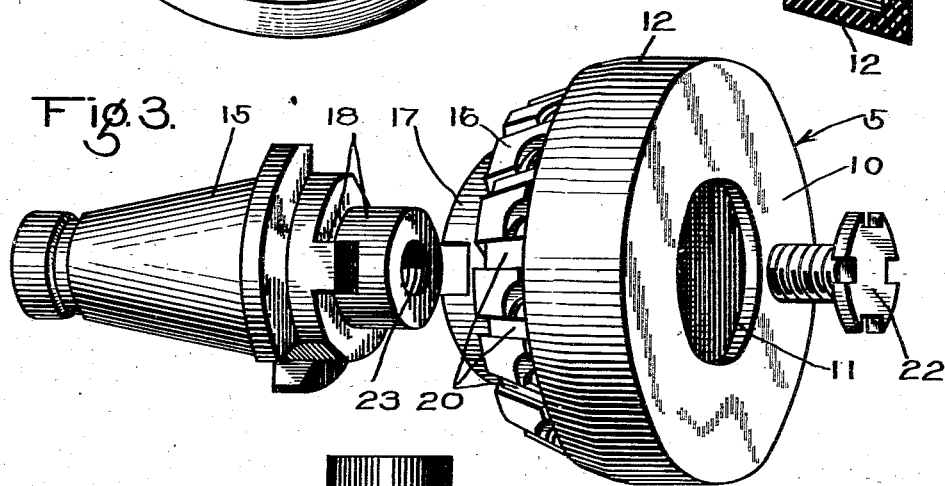
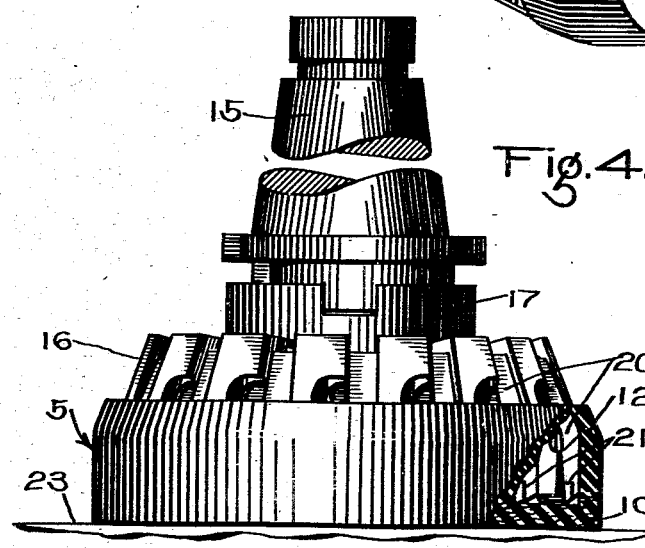
INVENTOR
THOMAS MAXWELL
BY
A. M. Higgins
ATTORNEY Patented Oct. 24, 1939

2,177,531

UNITED STATES PATENT OFFICE 2,177,531

TOOL PROTECTOR

Thomas Maxwell, Pittsburgh, Pa., assignor to The Westinghouse Air Brake Company, Wilmerding, Pa., a corporation of Pennsylvania Application May 21, 1938, Serial No. 209,180

7 Claims. (Cl. 29—105)

This invention relates to tool protectors, and more particularly to a guard or protective cover adapted to be removably secured to a milling cutter or the like.

Milling cutters and similar interchangeable tools of the high speed type adapted to be used in modern machine tool practice are usually constructed of expensive metals and require accurate grinding and adjustment, so that the cost of such a tool is considerable. For example, a milling cutter having specially inserted tungsten carbide blades or teeth costs several hundred dollars.

Because of the heavy, unweldy construction of a milling cutter and the sharp cutting blades projecting from it, difficulty has been experienced in providing means to permit the necessarily frequent handling of this type of tool, and storing thereof when not in use, in such a manner as will prevent chipping of the brittle cutting surfaces as well as avoid the danger of accidental injury to the workman.

One object of my invention is to provide simple and inexpensive means whereby a milling cutter or other tool may be handled at will without risk of injury to the workman due to the sharp cutting edges, and so that it may be placed in any desired position for storage purposes without possibility of damage to the cutting blades.

Another object of the invention is to provide a durable tool protector made of yieldable material, which is adapted to be readily placed on or removed from a milling cutter or the like, and which while secured on the tool will cover the cutting blades thereof so as to prevent undesired contact of the blades with the workman's hands or with hard surfaces, while facilitating the necessary handling of the milling cutter when it is being secured to an arbor and while being mounted in a milling machine.

A further object of my invention is to provide a protective cover for a milling cutter having a flexible collar portion made of soft rubber or other suitable material adapted to enclose and grip the bladed portion of the tool, and a substantially flat base portion made of yielding but tough material, such as corded rubber composition, whereby a milling cutter carrying the cover may be conveniently stored in a safe position.

Other objects and advantages of my invention will appear in the following detailed description thereof, when read with reference to the accompanying drawing, wherein—

Fig. 1 is a plan or face view of a tool protector embodying my invention; Fig. 2 is a vertical sectional view of the tool protector; Fig. 3 is a perspective view showing the manner in which a milling cutter carrying the tool protector may be secured to an arbor; and Fig. 4 is an elevational view, partly in section, of a milling cutter and arbor having my tool protector associated therewith, and illustrating a convenient position in which the assembly may be stored without the possibility of damage to the cutting blades.

As shown in Figures 1 and 2 of the drawing, the tool protector 5 comprises a substantially flat disc or base portion 10 having a central aperture 11 formed therein, and an annular skirt portion 12, which is formed as a frustrum of a cone and has the large end thereof moulded integrally with the peripheral portion of the base portion 10. The tool protector may be made entirely of a suitable yielding, elastic material, but I prefer to form the base portion 10 of a tough wear-resistant rubber composition having a degree of resiliency and reenforced by fabric or cords such as indicated at 14, and to make the inwardly sloping skirt portion 12 of a relatively soft and elastic rubber composition.

Illustrated in Fig. 3 of the drawing is an arbor 15, which is adapted to be mounted in the usual spindle portion of a milling machine, not shown, and a milling cutter 16 having a sleeve portion 17 adapted for interlocking engagement with complementary portions 18 of the arbor. The milling cutter 16 in the form shown in the drawing is provided with a plurality of interchangeable teeth or blades 20, which may be secured to the body of the cutter by any suitable means, such as the usual taper bushings and screws. Each of the blades 20 may be tipped with tungsten carbide cutting portions 21, as is best shown in Fig. 4, which render the milling cutter suitable for high speed machining work.

According to my invention, the tool protector 5 is applied to the milling cutter 16 by expanding or stretching the skirt portion 12 and fitting the same over the section of the milling cutter carrying the cutting blades, as shown in Fig. 3, so that the skirt portion and the base portion 10 completely surround and cover the tungsten carbide cutting surfaces of the blades. The elastic skirt portion 12 is of course adapted to grip the milling cutter tightly enough to hold the tool protector 5 in place and to prevent its being unintentionally dislodged while the milling cutter is being handled. I have found in practice that, with the tool protector 5 thus secured to the milling cutter, a workman may grasp the cutter in any convenient fashion while installing the cutter on or removing it from a milling machine or grinding machine without any risk of personal injury due to the cutting blades. At the same time, the expensive tungsten carbide tipped blades are also protected against accidental chipping during these operations.

The tool protector 5 need not be removed while the milling cutter 16 is being secured to the arbor 15, since the aperture 11 is so disposed in the base portion 10 as to permit insertion therethrough of the usual arbor bolt 22, which is adapted to be screwed into a suitably threaded bore 23 formed in the arbor 15 for holding the milling cutter in place. As shown in Fig. 4 of the drawing, the assembled arbor 15 and milling cutter 16 having the tool protector 5 secured thereon may be conveniently stored when not in use by placing the tool in a vertical position with the base portion 10 of the protector 5 resting on the support 23. The tough corded rubber composition of which the base portion 10 is formed is adapted on the one hand to act as a yielding support or cushion for the brittle teeth 20 of the cutter 16, and on the other hand to resist wear and tear for a long period of time.

It will thus be apparent that a milling cutter or the like having associated therewith a tool protector made in accordance with my invention may be freely handled and stored without the possibility of injury to a workman's hands or to the cutting blades of the tool. It will further be evident that the features of the invention are not limited to a protector designed solely for use with a milling cutter, but may be embodied in other protectors of suitable form and adapted to be applied to reamers, drills, boring heads, facing heads, files and diamond cutters.

Having now described my invention, what I claim as new and desire to secure by Letters Patent, is:

1. A protective cover for a machine tool cutter of the demountable type having securing means, comprising a body made of yieldable material adapted to enclose the cutting portion of said cutter, and having a flexible portion adapted to slip over and grip a portion of said cutter for securing said cover thereon, said body having an opening adapted to clear said securing means, whereby said cutter may be mounted or demounted with the cover in place.

2. A protective cover for a machine tool cutter, comprising a body adapted to surround the cutting portion of said cutter, and having a flexible annular skirt portion adapted to grip said cutter and a relatively stiff base portion made of tough but yieldable material.

3. A protective cover for a machine tool cutter, comprising a body made of yieldable material adapted to enclose the cutting portion of said cutter, and having a flexible annular portion made of relatively soft rubber composition adapted to grip said cutter and a substantially flat base portion made of tough rubber composition formed on said annular portion.

4. In a guard cover for slipping over a machine tool cutter of the type having a plurality of cutting blades and adapted to be secured in operative position by an arbor bolt or the like, a protective body comprising a base portion of tough but yieldable material having an aperture to permit insertion of an arbor bolt, and a flexible annular skirt portion of elastic material formed on said base portion and adapted to overlie the cutting edges of said blades.

5. In a guard cover for a rotary milling cutter having a plurality of cutting blades and adapted to be secured in operating position by an arbor bolt or the like, a protective body made of flexible material and comprising a substantially flat base portion having an aperture through which the arbor bolt may be inserted for mounting the milling cutter in a machine, and an elastic annular skirt portion extending from said base portion and being adapted to grip and overlie the portion of said cutter including said blades.

6. In a guard cover for a rotary milling cutter having a plurality of cutting blades and adapted to be secured in operating position by an arbor bolt, a yieldable body for covering the portion of said cutter including said blades, comprising a relatively stiff disc portion made of tough corded rubber composition or the like and having an aperture to permit insertion of the arbor bolt during mounting of the cutter in a milling machine, and a flexible frusto-conical skirt portion made of elastic rubber composition normally extending inwardly from the peripheral portion of said disc porton and adapted to be flexed into gripping engagement with the outer surface of said cutter for holding said guard cover in place.

7. In a guard cover for a machine tool cutter of the type having a plurality of cutting blades and adapted to be secured in operating position by an arbor bolt or the like, a yieldable body for covering the cutting portions of said blades comprising a disc portion having an aperture formed therein through which the arbor bolt may be inserted in mounting the cutter in a machine, and a flexible frusto-conical skirt portion normally extending inwardly from the peripheral portion of said disc portion and adapted to be flexed into gripping engagement with an outer surface of said cutter for holding said guard cover in place.

THOMAS MAXWELL.